(12) United States Patent  
Singh et al.

(10) Patent No.: US 8,919,131 B2  
(45) Date of Patent: Dec. 30, 2014

(54) SYSTEM AND METHOD FOR COMBUSTION DYNAMICS CONTROL BY ACOUSTIC CONTROL/CANCELLATION OF FUEL FLOW FLUCTUATION AT FUEL INJECTION LOCATION

(75) Inventors: Kapil Kumar Singh, Rexford, NY (US); Fei Han, Clifton Park, NY (US); Shiva Srinivasan, Greer, SC (US); Kwanwoo Kim, Mason, OH (US); Preetham Balasubramanyam, Schenectady, NY (US); Qingguo Zhang, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1087 days.

(21) Appl. No.: 12/942,687

(22) Filed: Nov. 9, 2010

(65) Prior Publication Data  
US 2012/0111019 A1 May 10, 2012

(51) Int. Cl.  
*F02C 7/22* (2006.01)  
*F02C 7/228* (2006.01)  
*F02C 9/50* (2006.01)  
*F23N 5/24* (2006.01)  
*F23N 5/16* (2006.01)

(52) U.S. Cl.  
CPC . *F02C 7/228* (2013.01); *F02C 9/50* (2013.01); *F23N 5/24* (2013.01); *F05D 2260/96* (2013.01); *F05D 2270/14* (2013.01); *Y02T 50/677* (2013.01); *F23N 5/16* (2013.01); *F23R 2900/00013* (2013.01)  
USPC ................................. 60/776; 60/725; 431/1

(58) Field of Classification Search  
CPC .......... Y02E 20/16; F02C 6/18; F01K 23/10; Y02T 50/675  
USPC ................. 60/772, 740–748, 39.01, 776, 725  
See application file for complete search history.

(56) References Cited

U.S. PATENT DOCUMENTS

| | | | |
|---|---|---|---|
| 6,054,775 A | 4/2000 | Vocaturo | |
| 6,464,489 B1 * | 10/2002 | Gutmark et al. | 431/1 |
| 7,457,710 B2 | 11/2008 | Schuermans et al. | |
| 7,559,234 B1 | 7/2009 | Chorpening et al. | |
| 7,637,096 B2 | 12/2009 | Razzell et al. | |
| 7,775,052 B2 | 8/2010 | Cornwell et al. | |
| 2008/0121736 A1 | 5/2008 | Mao et al. | |
| 2009/0133379 A1 * | 5/2009 | Mendoza et al. | 60/39.281 |
| 2010/0203460 A1 | 8/2010 | Formigoni | |

* cited by examiner

*Primary Examiner* — Gerald L Sung  
*Assistant Examiner* — Marionelie Frazer-Vicenty  
(74) *Attorney, Agent, or Firm* — Ann M. Agosti

(57) ABSTRACT

A combustion dynamics control system for an aviation based or land based gas turbine engine employs an acoustic driver that is configured to drive pressure perturbations across a premixed fuel injection orifice to substantially zero in response to a control signal such that fuel flow perturbations across the fuel injection orifice are substantially zero.

8 Claims, 2 Drawing Sheets

Figure 1:
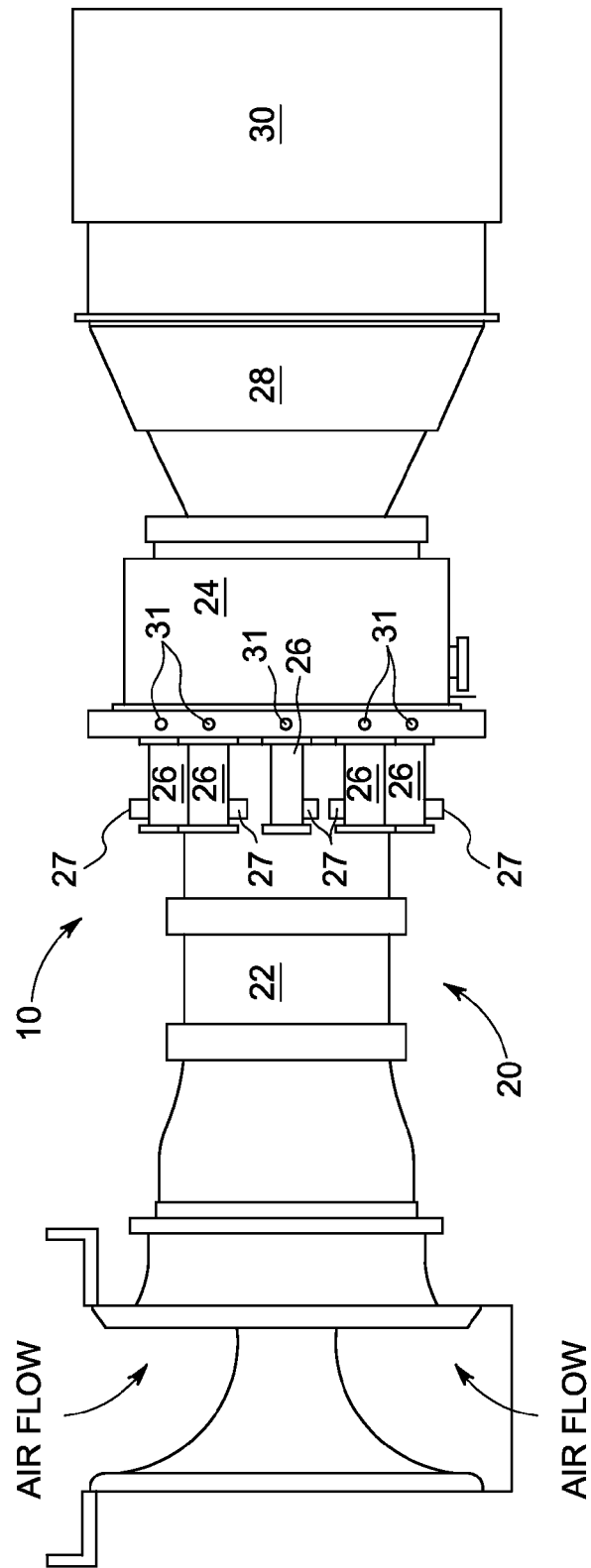

SYSTEM AND METHOD FOR COMBUSTION DYNAMICS CONTROL BY ACOUSTIC CONTROL/CANCELLATION OF FUEL FLOW FLUCTUATION AT FUEL INJECTION LOCATION

BACKGROUND

This invention generally relates to combustion dynamics, and more particularly, to systems and methods for combustion dynamics control in both aviation and land-based gas turbines via acoustic control and/or cancellation of fuel flow fluctuation at the fuel injection location.

Combustion dynamics occur when the inherent unsteadiness of a flame couples with the natural modes of a combustor and establishes a feedback cycle leading to high amplitudes of pressure perturbations and potential significant damage to the corresponding hardware. Combustion dynamics are known to plague gas turbines for power generation, prime-mover, aviation, and marine applications.

Combustion dynamics is a universal issue with and presents one of the biggest challenges faced by gas turbine manufacturers since the introduction of premixed combustion systems. Various techniques have been employed to address combustion dynamics, including without limitation, altering the generation mechanism, varying the combustor dimensions or damping, and control/suppression of the problem by using active/passive devices/methods.

Combustion dynamics has led to catastrophic combustor damage/failure when observed at very high amplitudes. Even when less severe, it restricts the operational envelope of a gas turbine and hinders the best possible performance. Combustion dynamics is still a pervasive problem with existing and installed gas turbines. Further, with stricter emissions regulations and fuel-flexibility, the problems relating to combustion dynamics are expected to get worse.

In view of the foregoing, there is a need for a system and method for controlling combustion dynamics in both aviation and land-based gas turbines to achieve optimal operational performance in terms of emissions and power output.

BRIEF DESCRIPTION

One embodiment of the present disclosure is directed to a combustion dynamics control system, comprising:

a fuel injector configured to receive a premixed fuel via a fuel injection orifice; and an acoustic driver configured to drive pressure perturbations across the fuel injection orifice to substantially zero in response to a control signal such that fuel flow perturbations across the fuel injection orifice are substantially zero in response thereto.

Another embodiment of the present disclosure is directed to a combustion dynamics control system for a gas turbine engine, the combustion dynamics control system comprising:

a fuel injector;

a premixed fuel tube configured to deliver a premixed fuel to the fuel injector via a premixed fuel tube injection orifice; and an acoustic driver configured to drive pressure perturbations across the premixed fuel tube injection orifice to substantially zero in response to a control signal such that fuel flow perturbations across the premixed fuel tube injection orifice are substantially zero in response thereto.

According to yet another embodiment, a method of operating a gas turbine engine comprises:

injecting a premixed fuel into the main flow path of a gas turbine engine fuel injector via a premixed fuel tube injection orifice; and transmitting an acoustic pulse into the main flow path while the premixed fuel is being injected into the main flow path such that the acoustic pulse drives pressure perturbations across the premixed fuel tube injection orifice to substantially zero in response to a control signal such that fuel flow perturbations across the premixed fuel tube injection orifice are substantially zero in response thereto.

DRAWINGS

Figure 2:
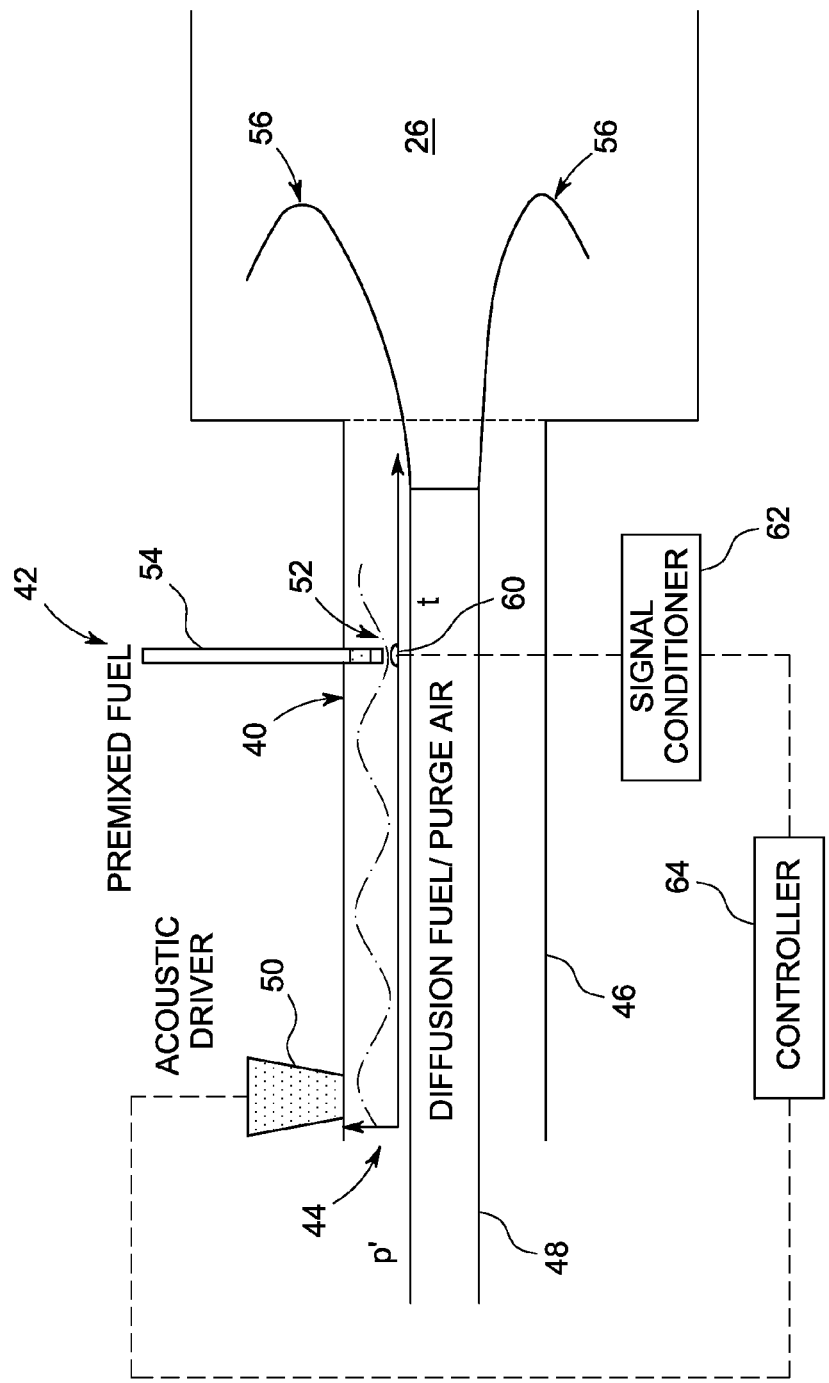

These and other features, aspects, and advantages of the present invention will become better understood when the following detailed description is read with reference to the accompanying drawing, wherein:

FIG. 1 illustrates a gas turbine engine suitable to employ combustion dynamics control via acoustic control and/or cancellation of fuel flow fluctuation at a premixed fuel injection location according to one embodiment; and FIG. 2 illustrates a combustion dynamics control system for a gas turbine engine according to one embodiment.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The equivalence ratio fluctuations caused by the perturbations in fuel flow are known to be one of the primary causes of combustion dynamics in gas turbines. The embodiments described herein function to solve the challenges associated with combustion dynamics control in both aviation and land-based gas turbines by acoustically controlling the fuel flow at the gas turbine fuel injection location. According to the embodiments described herein, acoustic waves are generated and transmitted through the nozzle in such a way that a pressure node is generated at the fuel injection location. In this manner, pressure fluctuations across the injection orifice/hole are eliminated such that fuel flow perturbations are removed, thus removing one of the fundamental mechanisms believed to be responsible for high combustion dynamics associated with premixed combustion systems.

FIG. 1 illustrates an exemplary gas turbine system 10. Turbine system 10 may have, among other systems, a gas turbine engine 20. Gas turbine engine includes a compressor section 22, a combustor section 24 including a plurality of combustor cans 26 and a corresponding ignition system 27, and a turbine section 28 coupled to compressor section 22. An exhaust section 30 channels exhaust gases from gas turbine engine 20.

In general, compressor section 22 compresses incoming air to combustor section 24 that mixes the compressed air with the fuel and burns the mixture to produces high-pressure, high-velocity gas. Turbine section 28 extracts energy from the high-pressure, high-velocity gas flowing from the combustor section 24. Only those aspects of gas turbine system 10 useful to illustrate the embodied combustion dynamics control process will be discussed to enhance clarity and preserve brevity.

Compressor section 22 may include any device capable of compressing air. This compressed air may be directed to an inlet port of combustor section 24. Combustor section 24 may include a plurality of fuel injectors configured to mix the compressed air with a fuel and deliver the mixture to one or more combustor cans 26 of combustor section 24. A suitable fuel injector is described herein with reference to FIG. 2 according to one embodiment. The fuel delivered to each combustor can 26 may include any liquid or gaseous fuel, such as diesel or natural gas. The fuel delivered to any combustor can 26 may undergo combustion to form a high pressure mixture of combustion byproducts. The resultant high temperature and high pressure mixture from combustor section 24 may be directed to turbine section 28. Combustion gases may then exit turbine section 28 before being discharged to the atmosphere through exhaust section 30.

FIG. 2 is a simplified diagram illustrating one embodiment of a fuel injector 40 coupled to a combustor can 26. Fuel injector 40 may deliver a premixed fuel 42 and compressed air 44 to combustor can 26 for combustion. Equivalence ratio fluctuations caused by perturbations in fuel flow are known to be one of the primary causes of combustion dynamics in gas turbines, as stated herein.

Some embodiments of fuel injector 40 include multiple flow paths that deliver different concentrations of fuel and air to combustor section 24. These multiple flow paths may include a main flow path 46 and a pilot flow path 48. Main flow path 46 may deliver a premixed lean fuel-air mixture 42 and 44 to combustor cans 26. The main fuel may burn in combustor cans 26 to create premixed flames 56. Premixed flames are the flames that are created when fuel and air are first mixed in fuel injector 40 and then burned in combustor cans 26. A pilot flow path 48 may additionally deliver a pressurized spray of fuel along with compressed air to combustor cans 26. The pilot fuel path 48 may burn in combustor cans 26 to create a diffusion flame 56. Diffusion flames 56 are flames that are created when fuel and air mix and burn at the same time. Diffusion flames 56 may have a higher temperature than premixed flames and may serve as a localized hot flame to stabilise the combustion process and prevent lean blowout.

According to some embodiments described in further detail herein, a combustion control system may monitor the pressure pulses in fuel injectors 40 and control operation of one or more corresponding acoustic drivers 50 in response thereto. A suitable acoustic driver 50 may comprise any transducer which converts electrical, mechanical, or other forms of energy into sound energy sufficient to generate acoustic waves that are transmitted through its corresponding fuel injection nozzle 40 in such a way that a pressure node is generated at the fuel injection location 52. More specifically, driving the pressure perturbation at the fuel injection location, i.e. across the fuel injection 54 orifice, to zero also drives the fuel flow perturbation across the fuel injection 54 orifice to zero. In this way, the resultant pressure node at fuel injection location 52 suppresses and/or cancels fuel flow fluctuations with fuel injection nozzle 40 by acoustically controlling the fuel flow at the corresponding fuel injection location 52. This suppression/cancellation of pressure fluctuations across the injection 54 orifice/hole substantially eliminates fuel flow perturbations thereby removing one of the fundamental mechanisms believed to be responsible for high combustion dynamics associated with premixed combustions systems. The type of acoustic driver 50 including its capabilities are selected based upon the particular application requirements that may include without limitation, the type(s) of fuel employed, the physical geometries of the fuel injectors, flow paths, and so on. Any suitable acoustic driver 50 only need drive the pressure perturbation(s) at the fuel injection location, i.e. across the fuel injection 54 orifice, to zero, thus driving the fuel flow perturbation(s) across the fuel injection 54 orifice to zero.

With continued reference to FIG. 2, acoustic pulses across fuel injection 54 orifice may be monitored via a sensor 60 that may be, for example, a piezoelectric sensor fluidly coupled to combustor 24 to detect a pressure pulse at fuel location 52. Sensor 60 is positioned at a location where the pressure pulse at fuel location 52 may be accurately detected without being exposed to adverse environmental conditions. Sensor 60 may generate a signal that corresponds to the pressure pulse at fuel location 52. This sensor signal may be transmitted to a signal conditioner 62 that may perform one or more signal conditioning operations that may include, without limitation, transformation of the sensor signal from the time domain to the frequency domain, and band pass filtering of the sensor signal to allow signals within a predefined frequency range to pass through to a corresponding controller 64. Controller 64 may be configured to compare the signal generated via the signal conditioner 62 to one or more threshold values, and control actuation of the acoustic driver 50 in response to the comparison. This controlled feedback actuation of acoustic driver 50 functions to drive the pressure perturbation(s) at the fuel injection location 52, i.e. across the fuel injection 54 orifice, to zero, thus driving the fuel flow perturbation(s) across the fuel injection 54 orifice to zero as stated herein.

Fuel injector 40 may have a generally tubular configuration with an inner and an outer tube 48, 46 arranged concentrically about a longitudinal axis. The outer tube 46 of fuel injector 40 may comprise a premix barrel 54 and the inner tube 48 may comprise a pilot. An annular space between inner and outer tubes 48, 46 may include the main flow path that delivers the main fuel stream to combustor cans 26. Compressed air from compressor section 22 depicted in FIG. 1 may be directed into fuel injector 40 through an air swirler, not shown, that may include a plurality of curved or straight blades attached to fuel injector 40 to swirl the incoming compressed air and help create a well mixed fuel-air mixture that comprises the main fuel supply.

Combustion dynamics can lead to catastrophic combustor damage/failure when observed with very high amplitudes as stated herein. Even when less severe, it restricts the operation envelope of the gas turbine and hinders the best possible performance. The embodiments described herein advantageously function to alleviate unscheduled shut-downs for the machines and as well assist the machines in achieving the best operational performance in terms of emissions and power output to provide a more reliable and efficient gas turbine with minimal emissions.

Although a combustion dynamics control process has been described herein using a specific configuration of fuel injector 40, the combustion dynamics control process of the current disclosure will be applicable to any turbine engine where a pilot fuel supply and a main fuel supply are directed to a combustor section. While only certain features of the invention have been illustrated and described herein, many modifications and changes will occur to those skilled in the art. It is therefore, to be understood that the appended claims are intended to cover all such modifications and changes as fall within the true spirit of the invention.

The invention claimed is:
1. A combustion dynamics control system, comprising:
a fuel injector for receiving a premixed fuel via a premixed fuel injector coupled directly to the fuel injector, wherein the premixed fuel injector comprises a premixed fuel injection orifice;

an acoustic driver for generating an acoustic pressure node in the fuel injector at a location of the premixed fuel injection orifice, wherein the acoustic driver is coupled directly to the fuel injector upstream of the premixed fuel injector orifice;

a sensor for measuring acoustic pressure in the fuel injector solely at the location of the premixed fuel injection orifice;

a signal conditioner for conditioning the sensor signal and for generating a conditioned sensor signal there from; and a controller for controlling the acoustic driver, wherein the acoustic driver generates the acoustic pressure node in the fuel injector at the location of the premixed fuel injection orifice based on the conditioned sensor signal.

2. The combustion dynamics control system according to claim 1, wherein the fuel injector is a gas turbine fuel injector selected from an avionics based gas turbine fuel injector and a land based gas turbine fuel injector.

3. The combustion dynamics control system according to claim 1, wherein the signal conditioner is configured to transform a time domain sensor signal to a frequency domain sensor signal to generate the conditioned sensor signal.

4. The combustion dynamics control system according to claim 1, wherein the signal conditioner is configured to band pass filter the sensor signal to generate the conditioned sensor signal.

5. A combustion dynamics control system for a gas turbine engine, the combustion dynamics control system comprising:

a fuel injector;

a premixed fuel tube coupled directly to the fuel injector, the premixed fuel tube delivering a premixed fuel to the fuel injector via a premixed fuel tube injection orifice;

an acoustic driver for generating an acoustic pressure node in the fuel injector at a location of the premixed fuel injection orifice, wherein the acoustic driver is coupled directly to the fuel injector upstream of the premixed fuel tube injection orifice;

a sensor for measuring acoustic pressure in the fuel injector solely at the location of the premixed fuel injection orifice and for generating a signal there from, wherein the sensor is disposed in the fuel injector at the location of the premixed fuel injection orifice;

a signal conditioner for conditioning the sensor signal and for generating a conditioned sensor signal there from; and a controller for controlling the acoustic driver, wherein the acoustic driver generates the acoustic pressure node in the fuel injector at the location of the premixed fuel injection orifice based on the conditioned sensor signal.

6. The combustion dynamics control system according to claim 5, wherein the gas turbine engine is selected from an avionics based gas turbine engine and a land based gas turbine engine.

7. The combustion dynamics control system according to claim 5, wherein the signal conditioner is configured to transform a time domain sensor signal to a frequency domain sensor signal to generate the conditioned sensor signal.

8. The combustion dynamics control system according to claim 5, wherein the signal conditioner is configured to band pass filter the sensor signal to generate the conditioned sensor signal.

* * * * *